(12) United States Patent
Poulos, Jr. et al.

(10) Patent No.: US 7,735,392 B2
(45) Date of Patent: Jun. 15, 2010

(54) THUMB/TWIST THROTTLE CONTROL DEVICE

(76) Inventors: Danny Poulos, Jr., 23346 Three Bridge Rd., Council Bluffs, IA (US) 51503; George Poulos, 5144 Franklin St., Omaha, NE (US) 68104

( * ) Notice: Subject to any disclaimer, the term of this patent is extended or adjusted under 35 U.S.C. 154(b) by 854 days.

(21) Appl. No.: 11/581,187

(22) Filed: Oct. 13, 2006

(65) Prior Publication Data

US 2008/0141819 A1    Jun. 19, 2008

(51) Int. Cl.
*F16C 1/10* (2006.01)
(52) U.S. Cl. .................................. 74/502.2
(58) Field of Classification Search ............. 74/473.3, 74/482, 491, 500.5, 501.6, 502.2, 551.9
See application file for complete search history.

(56) References Cited

U.S. PATENT DOCUMENTS 5,775,167 A  *  7/1998  Maietta ..................... 74/480 R
6,276,230 B1 *  8/2001  Crum et al. ................. 74/551.9
6,651,524 B2 * 11/2003  Dawson et al. ............... 74/513
6,658,965 B2 * 12/2003  Allen .......................... 74/526
7,571,665 B2 *  8/2009  Sandstrom et al. ......... 74/502.2
2003/0150287 A1*  8/2003  Lev-Ran ...................... 74/488

* cited by examiner

*Primary Examiner*—Vicky A Johnson
(74) *Attorney, Agent, or Firm*—Keller LaPuma Woodard PC

(57) ABSTRACT

A thumb-twist throttle control device for vehicles includes a control device housing, a twist-type throttle control device mounted thereon which includes a rotatable handle and a thumb-type throttle control device mounted thereon generally adjacent the twist-type throttle control device, the thumb-type throttle control device including an outwardly-extending lever pivotably mounted on the control device housing. A throttle control device control mechanism is operatively interposed between the twist-type and the thumb-type throttle control device and the throttle of the vehicle and is operative to select one of the twist-type and the thumb-type throttle control device and to operatively connect the selected one of the twist-type and the thumb-type throttle control device to the throttle of the vehicle for operation thereof, with each control device being independently operable to control the throttle yet are not simultaneously operable, i.e. only one may control the throttle at any one time.

12 Claims, 16 Drawing Sheets

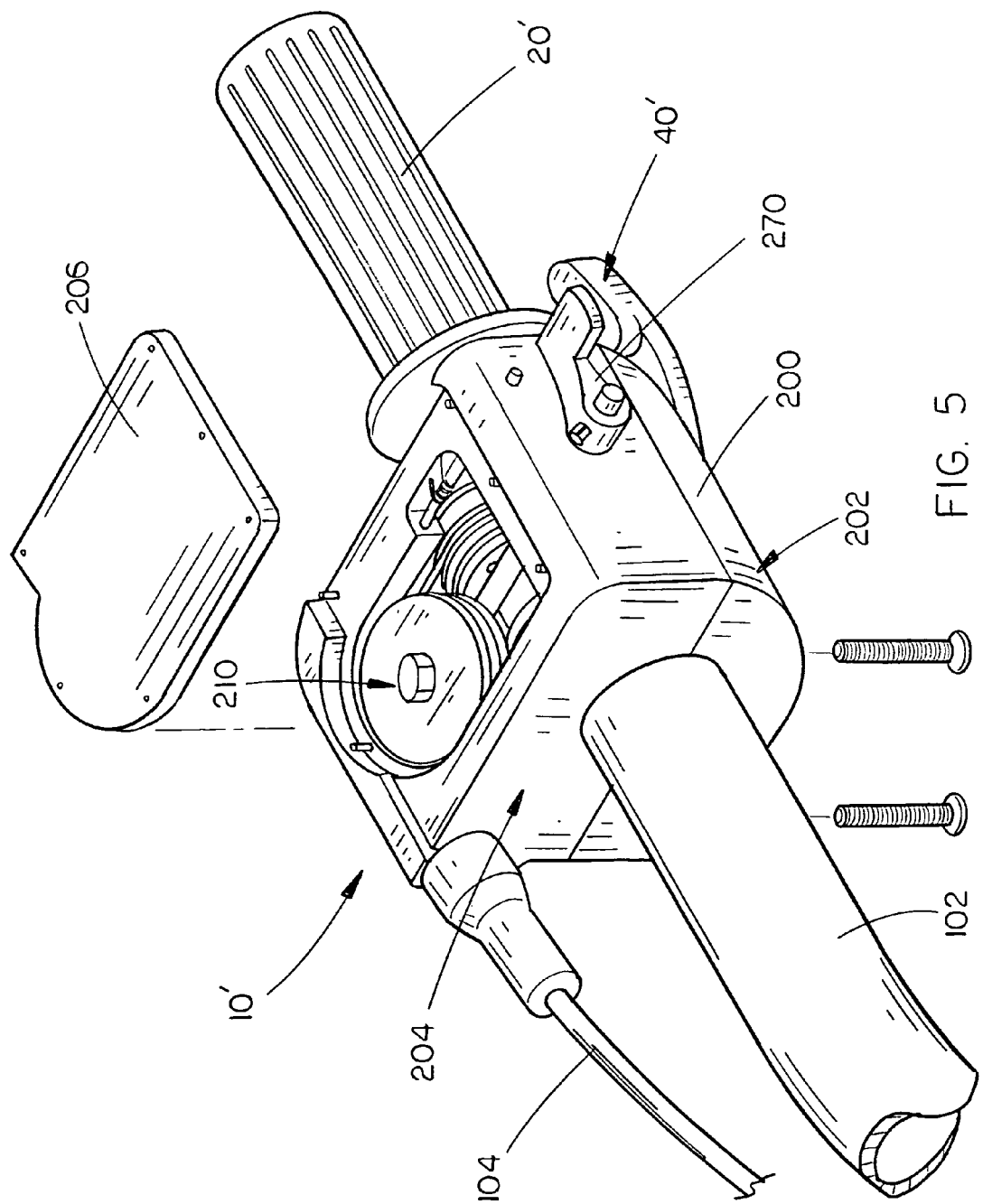

THUMB/TWIST THROTTLE CONTROL DEVICE

CROSS-REFERENCE TO RELATED PROVISIONAL PATENT

This application claims priority based on a provisional patent, specifically on the Provisional Patent Application Ser. No. 60/721,815 filed Oct. 13, 2005.

BACKGROUND OF THE INVENTION

1. Technical Field

The present invention relates generally to throttle control devices and, more particularly, to a thumb/twist throttle control device which includes a twist-type throttle control device having a rotatable handle mounted on the handlebars of the motorized vehicle and a thumb-type throttle control device mounted adjacent to the twist-type throttle control device, the thumb-type throttle control device including a pivotally mounted lever, the twist-type throttle control device and thumb-type throttle control device each being independently operable to control the throttle of the motorized vehicle such that when the twist-type throttle control device is being used to operate the throttle, the thumb-type throttle control device is disengaged and when the thumb-type throttle control device is operating the throttle, the twist-type throttle control device is disengaged.

2. Description of the Prior Art

There has been an exponential increase in the number of personal recreational vehicles such as all-terrain vehicles for use on land and wave runner-type vehicles for use on the water. There are many reasons for this significant increase, but perhaps the most obvious reason is that these vehicles provide the operator with excitement, enjoyment, and freedom when they are using the vehicles. Another benefit of the vehicles is that they are relatively simple to use, in that the operator may merely sit on the vehicle and engage the throttle to power the vehicle and move the vehicle forward. Throttles and engines are of course well-known in the industry, and there are many different types of control devices for the throttle which are currently used.

However, the most common type of throttle device used with such vehicles is known as the "thumb" throttle and generally includes a lever pivotally mounted on the handle bars of the vehicle, the lever mechanically operatively connected to the throttle in the engine of the vehicle such that rotation of the lever by the operator's thumb either increases or decreases the throttle valve opening to increase or decrease the power output by the engine. In general, the thumb throttle is an effective way to control the power output of the engine, but it has been found that use of the thumb throttle over an extended period of time is quite tiring and detracts from the enjoyment of use of the personal recreational vehicle. There is therefore a need for an alternative type of throttle that can be used with personal recreational vehicles in conjunction with the thumb throttle currently being used.

Another type of common throttle device used in connection with motor vehicles is the twist throttle in which a rotatable handle is mounted on the end of the handlebar, the rotatable handle being connected through a mechanical operational mechanism to the throttle of the engine such that rotation of the rotatable handle either increases or decreases the throttle valve opening to increase or decrease power being output by the engine. Such twist-type throttles are commonly used in connection with motorcycles, but generally are not used in connection with personal recreational vehicles such as those described above. The main reason for this is that operation of a motorcycle generally does not involve the same degree of pitching and shifting of the handlebars as does operation of personal operational vehicles such as ATVs and wave runners and therefore it is far easier to restrict unintentional rotation of the twist-type throttle when using a motorcycle than if the twist-type throttle were the only throttle available on the personal recreational vehicle. However, there are many instances when the user of an ATV or wave runner is not in a situation where there is significant motion of the vehicle and it is at these times that a twist-type throttle would be useful for an operator of the personal recreational vehicle. There is therefore a need for a combination throttle which includes beneficial elements of both the twist-type throttle and the thumb-type throttle.

Therefore, an object of the present invention is to provide a thumb-twist throttle control device for vehicles which will replace and improve upon the standard thumb throttles and twist throttles already in use.

Another object of the present invention is to provide a thumb-twist throttle control device for vehicles which includes a housing, a twist-type throttle control device rotatably mounted on the housing, a thumb-type throttle control device pivotably mounted on the housing generally adjacent the twist-type throttle control device and a throttle control device control mechanism operative to alternatively operatively connect a selected one of the twist throttle or thumb throttle to the throttle of the vehicle for control thereof.

Another object of the present invention is to provide a thumb-twist throttle control device for vehicles which will permit simple and quick switching between the twist-type throttle control device and the thumb-type throttle control device by the user of the present invention so that the user can use whichever throttle control is better suited for the current driving conditions.

Another object of the present invention is to provide a thumb-twist throttle control device for vehicles which is usable with ATVs, personal watercraft and many other types of vehicles.

Finally, an object of the present invention is to provide a thumb-twist throttle control device for vehicles which is relatively simple and durable in manufacture and design and which is safe, efficient and effective in use.

SUMMARY OF THE INVENTION

The present invention provides a thumb-twist throttle control device for vehicles which includes a control device housing, a twist-type throttle control device mounted on the control device housing and extending outwards therefrom, the twist-type throttle control device including a rotatable handle which is rotatable about its center longitudinal axis, and a thumb-type throttle control device mounted on the control device housing generally adjacent the twist-type throttle control device, the thumb-type throttle control device including an outwardly-extending lever pivotably mounted on the control device housing. A throttle control device control mechanism is mounted within the control device housing and is operatively interposed between the twist-type throttle control device and the thumb-type throttle control device and the throttle of the vehicle on which the thumb-twist throttle control device is mounted, the throttle control device control mechanism operative to select one of the twist-type throttle control device and the thumb-type throttle control device and to operatively connect the selected one of the twist-type throttle control device and the thumb-type throttle control device to the throttle of the vehicle on which the thumb-twist throttle control device is mounted. Finally, the throttle control device control mechanism is further operative to selectively engage and connect the selected one of the twist-type throttle control device and the thumb-type throttle control device to the throttle of the vehicle on which the thumb-twist throttle control device is mounted such that each is independently operable to control the throttle and such that when the twist-type throttle control device is being used to operate the throttle, the thumb-type throttle control device is disengaged and when the thumb-type throttle control device is operating the throttle, the twist-type throttle control device is disengaged.

The present invention thus provides an throttle control device which is superior in many respects to those devices currently found in the prior art. For example, the proximity of the thumb and twist throttle control devices permits use of whichever control device is desired by the user of the present invention. Furthermore, because the throttle controls are fixedly mounted on the handlebars of the vehicle, use of either throttle control device will provide a stable and solid support for the user of the vehicle. Finally, because the throttle control devices of the present invention are usable only in the alternative and not simultaneously, the safety factor for the present invention exceeds most other modified throttle devices found in the prior art. It is thus seen that the present invention provides a substantial improvement over those devices found in the prior art.

BRIEF DESCRIPTION OF THE DRAWINGS

FIG. 5 is a perspective view of a third alternative embodiment of the operational mechanism of the thumb/twist throttle control device of the present invention;

DESCRIPTION OF THE PREFERRED EMBODIMENT

Figure 1:
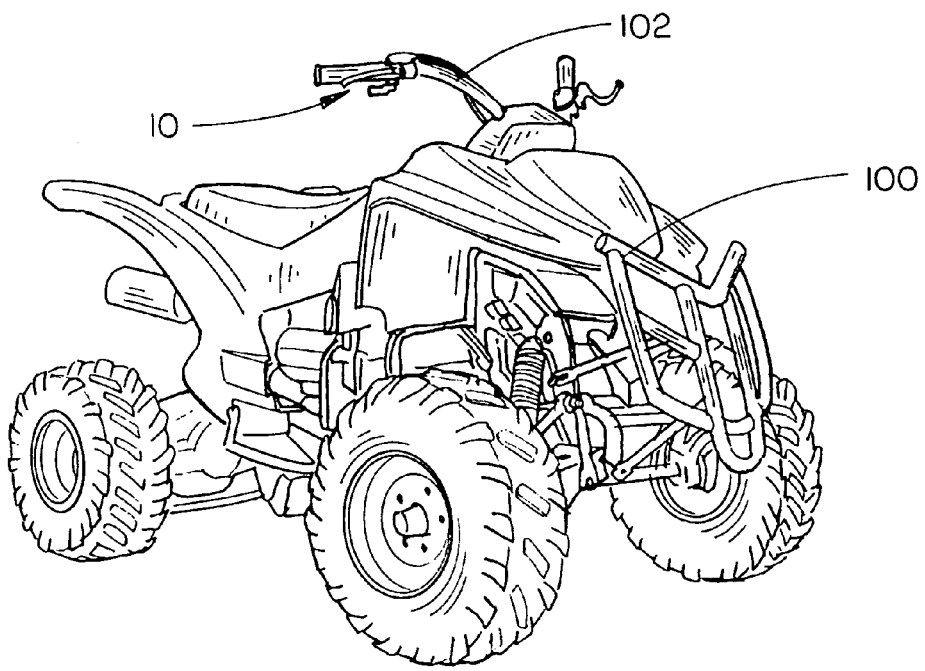
FIG. 1 is a perspective view of an all-terrain vehicle outfitted with the thumb/twist throttle control device of the present invention.

The thumb/twist throttle control device 10 of the present invention is shown best in FIGS. 1-4d as including a twist-type throttle control device 20 and a thumb-type throttle control device 40 mounted adjacent to and below the twist-type throttle control device 20 and a throttle control device control mechanism 60 on which the twist-type throttle control device 20 and thumb-type throttle control device 40 are mounted. As shown best in FIG. 2, the thumb-twist throttle control device 10 would be mounted on the end of the handlebar 102 of the personal recreational vehicle 100, in this case an ATV. It should be noted that the mounting of the thumb/twist throttle control device 10 on the handlebar 102 would preferably be done by extending the handlebar shaft into the thumb/twist throttle control device 10, specifically into the twist-type throttle control device 20, such that the twist-type throttle control device 20 is coaxially mounted on the handlebar 102 to provide a sturdy and safe connection and mounting for the thumb/twist throttle control device 10 of the present invention. Of course, however, the precise nature of the mounting of the thumb/twist throttle control device 10 on the personal recreational vehicle 100 is not critical so long as it is safely and securely mounted thereon.

Figure 3A:
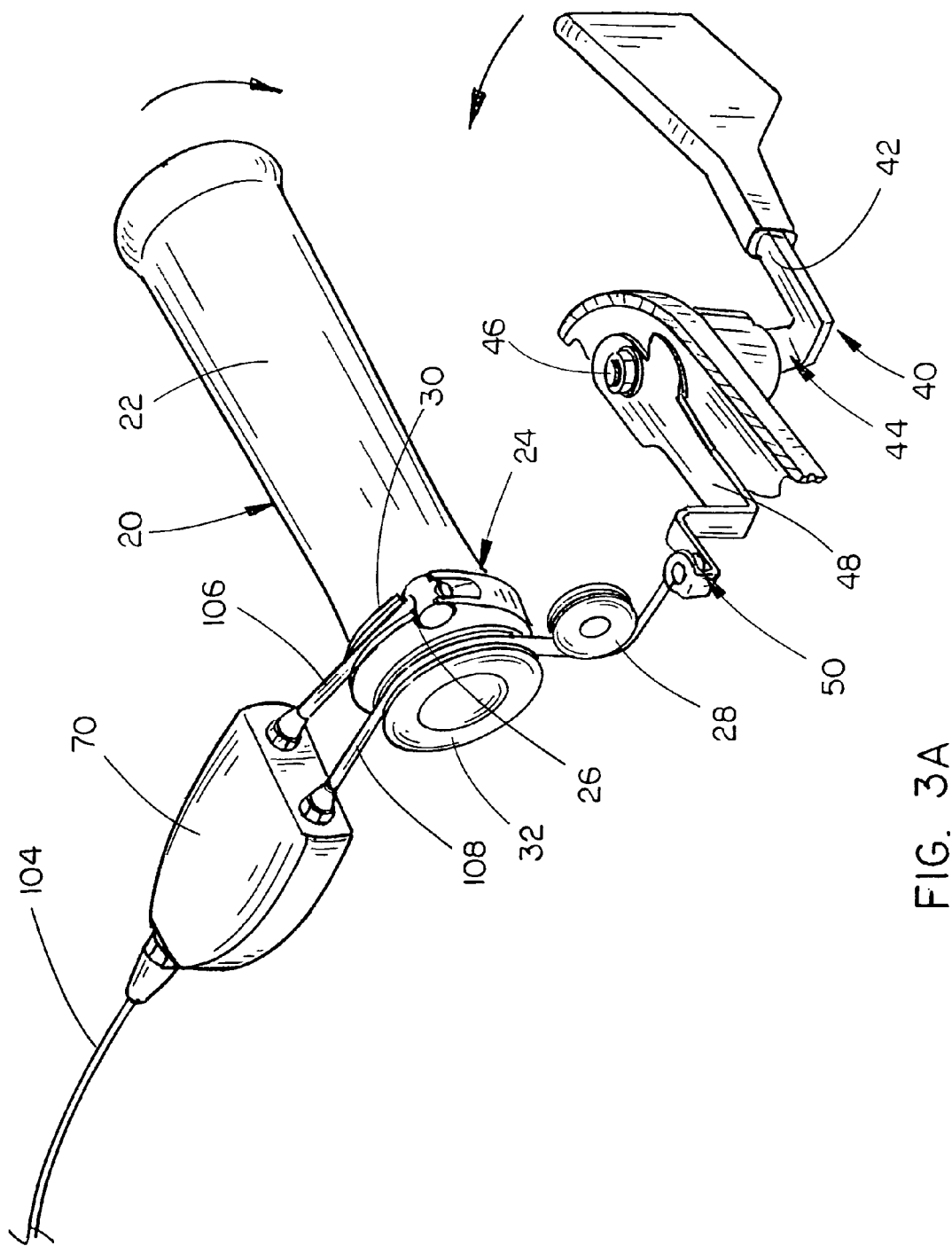
FIG. 3a is a detailed perspective view of one embodiment of the operating mechanism of the thumb-twist throttle control device.

In the preferred embodiment, the twist-type throttle control device 20 would preferably include a rotatably mounted handle 22 which is generally cylindrical in shape and is mounted to rotate about its center longitudinal axis, as shown best in FIG. 3a. Mounted on the inner end 24 of rotatably mounted handle 22 is a throttle cable engagement slot 26 mounted on cable pulley wheel 30 into which an end of the throttle cable 104 may be inserted such that rotation of the rotatable handle 22 rotates the throttle cable engagement slot 26, thus tensioning the throttle cable 104 and operating the throttle of the personal recreational vehicle 100. It should be noted that the exact size, shape, and construction materials used in connection with the rotatable handle 22 are not particularly critical to the present invention and will, to a large extent, depend on the preferences of the manufacturer and user of the present invention.

The thumb-type throttle control device 40 is also shown best in FIG. 3a as including a thumb lever 42 which is rotatably mounted beneath the twist-type throttle control device 20, the inner end 44 of thumb lever 42 mounted on an upright shaft 46 which is pivotally mounted to permit the thumb lever 42 to rotate about the center longitudinal axis of the upright shaft 46, as shown best in FIG. 3a. In the preferred embodiment, the inner end 44 of thumb lever 42 is connected to the lower section of the upright shaft 46 and a throttle cable connection bar 48 is connected to and extends outwards from the upper end of the upright shaft 46 for connection to the throttle cable 104, specifically a second extension section 108 of throttle cable 104. As shown in FIG. 3a, the second extension section 108 of throttle cable 104 would be connected to one end 50 of throttle cable connection bar 48 with the second extension section 108 of throttle cable 104 extending around a pair of pulleys 28 and 32, with pulley 32 mounted on the inner end 24 of rotatable handle 22 of twist-type throttle control device 20. In this manner, the connection of the second extension section 108 of throttle cable 104 to the thumb-type throttle control device 40 permits the thumb-type throttle control device 40 to operate the throttle and, likewise, the first extension section 106 of throttle cable 104 connected to the throttle cable engagement slot 24 of the twist-type throttle control device 20 permits the twist-type throttle control device 20 to also operate the throttle of the personal recreational vehicle 100.

Figure 3B:
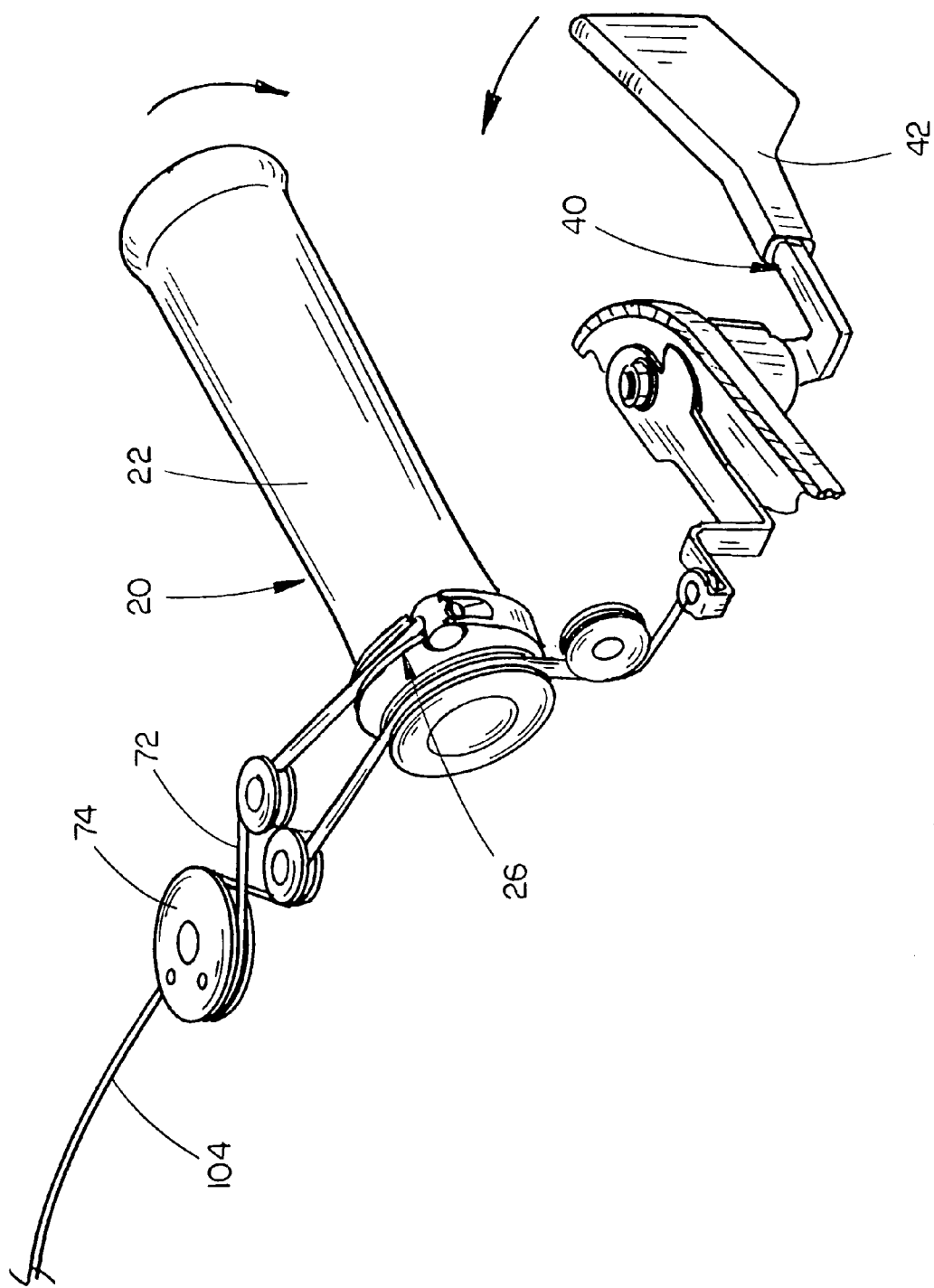
FIG. 3b is a detailed perspective view of a first alternative embodiment of the operational mechanism of the thumb/twist throttle control device of the present invention.
Figure 3C:
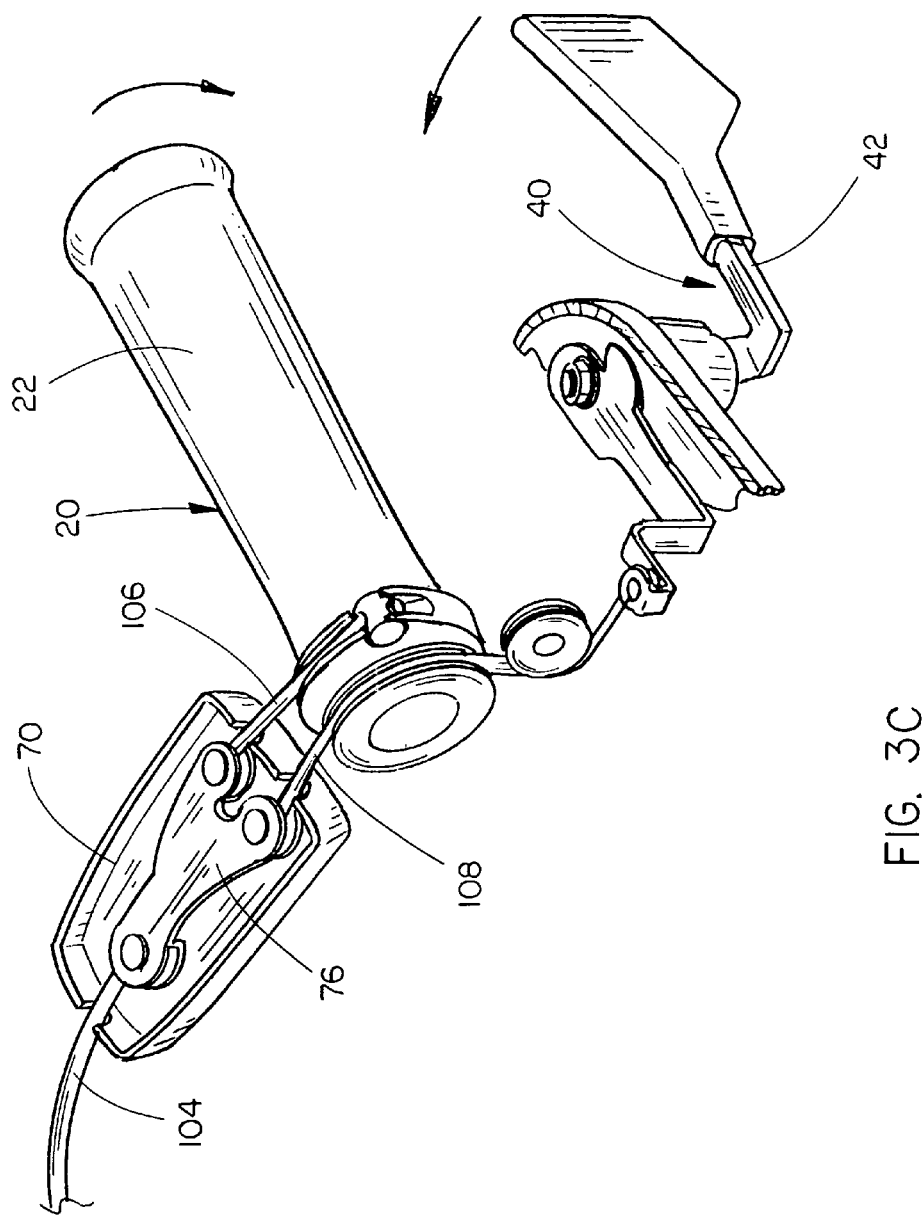
FIG. 3c is a detailed perspective view of a second alternative embodiment of the operational mechanism of the thumb/twist throttle control device of the present invention.

To permit this alternate operation of the vehicle's throttle, one of several different types of mechanical connections between the first extension section 106, second extension section 108, and the throttle cable 104 itself may be employed, such as those shown in FIGS. 3a, 3b, and 3c. Specifically, the embodiment shown in FIG. 3a would include a junction box 70 into which the first and second extension sections 106 and 108 of throttle cable 104 extend, with the throttle cable 104 itself extending out of the opposite end of the junction box 70. The junction box 70 is operative to permit either the first extension section 106 or the second extension section 108 to tension the throttle cable 104, thus controlling the opening of the throttle valve (not shown) of the personal recreational vehicle 100. It should be noted that many different mechanical connections between the first extension section 106, second extension section 108, and throttle cable 104, may be utilized with the present invention so long as the intended function of permitting either of the extension cables to operate the throttle cable 104 is maintained, but two variations of the junction box 70 are shown in FIGS. 3b and 3c for illustrative purposes.

Specifically, FIG. 3b illustrates that the first and second extension sections 106 and 108 are actually parts of a single throttle cable control cable 72 which extends around a pulley 74 mounted within the junction box 70. As the present invention is intended to be operated with only one or the other of the throttle control devices being engaged, when the twist-type throttle control device 20 is being utilized, the thumb-type throttle control device 40 is immobilized, and vice versa. Therefore, when the throttle cable control cable 72 is tensioned by rotation of the rotatable handle 22 of twist-type throttle control device 20, it pulls the pulley 74 in the direction of first extension 106 as the opposite end of the throttle cable control cable 72 is fixed in position. Therefore, the operation of the throttle valve of the personal recreational vehicle 100 via the throttle cable 104 is performed solely by rotation of the twist-type throttle control device 20, specifically the rotatable handle 22 of the twist-type throttle control device 20 which rotates the throttle cable engagement slot 26 mounted on cable pulley wheel 30. Alternatively, when the thumb-type throttle control device 40 is being utilized, the rotation of the thumb lever 42 pivots the throttle cable connection bar 48 about upright shaft 46, thus tensioning the second extension section 108 of throttle cable 104 and thereby pulling the throttle cable 104 towards the second extension section 108. Because the rotatable handle 22 of twist-type throttle control device 20 is fixed in position, the thumb-type throttle control device 40 thus retains complete control over the opening and closing of the throttle valve of the personal recreational vehicle 100 via the throttle cable 104.

FIG. 3c illustrates an alternative embodiment of the junction box 70 in which there is a simple Y-plate 76 mounted within the junction box 70 to which the throttle cable 104, first extension section 106, and second extension section 108 are connected. When one or the other of the first and second extension sections 106 and 108 are tensioned, the Y-plate 76 transfers the tensioning force directly to the throttle cable 104 and the initiating throttle control device, be it the twist-type throttle control device 20 or thumb-type throttle control device 40, thus retains control over operation of the throttle cable 104. The only significant disadvantage of the embodiment of FIG. 3c is that some degree of slack will be produced in whichever of the first and second extension sections 106 and 108 is not being used to tension the throttle cable 104, but as the expected slack will be no more than one-half to one inch in length, it is expected that providing an appropriate location for the slack to be taken up into will be easily achieved. Finally, it should be noted that, as was discussed previously, numerous other types of mechanical connections may be made between the first and second extension sections 106 and 108 and throttle cable 104, and numerous other types of connections may also be contemplated, such as electrical connections including "drive-by-wire" or the like may be incorporated into the thumb/twist throttle control device 10 of the present invention, specifically the junction box 70 which controls alternate operation of the throttle cable 104 by the twist-type throttle control device 20 and thumb-type throttle control device 40, and such variations should be understood to be a part of this disclosure.

Although the junction box 70 described above constitutes an important feature of the thumb/twist throttle control device 10 of the present invention, an even more important element of the present invention is shown in FIGS. 4a-4d, specifically the throttle control device control mechanism 60 which will now be described. In general, the throttle control device control mechanism 60 is designed to prevent simultaneous engagement of the twist-type throttle control device 20 and thumb-type throttle control device 40, in that the throttle control device control mechanism 60 prevents rotation of the rotatable handle 22 of twist-type throttle control device 20 when the thumb-type throttle control device 40 is operatively connected to throttle cable 104 and likewise, the throttle control device control mechanism 60 prevents operation of the thumb-type throttle control device 40, specifically rotation of thumb lever 42, when the twist-type throttle control device 20 is operatively connected to the throttle cable 104 and is in control of throttle operation. There are many different types of mechanisms which may be used to control and restrict simultaneous operation of the twist-type throttle control device 20 and thumb-type throttle control device 40, but a preferred embodiment of the throttle control device control mechanism 60 is shown in FIGS. 4a, 4b, 4c, and 4d.

Figure 2:
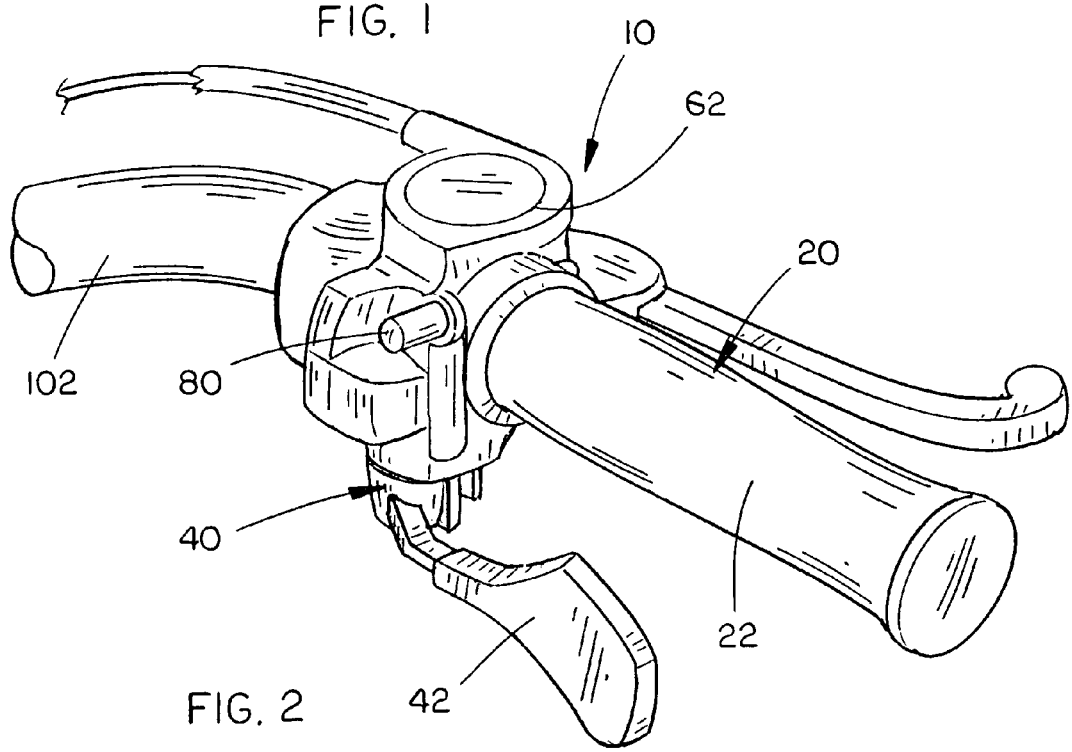
FIG. 2 is a perspective view of the thumb-twist throttle control device of the present invention.
Figure 4A:
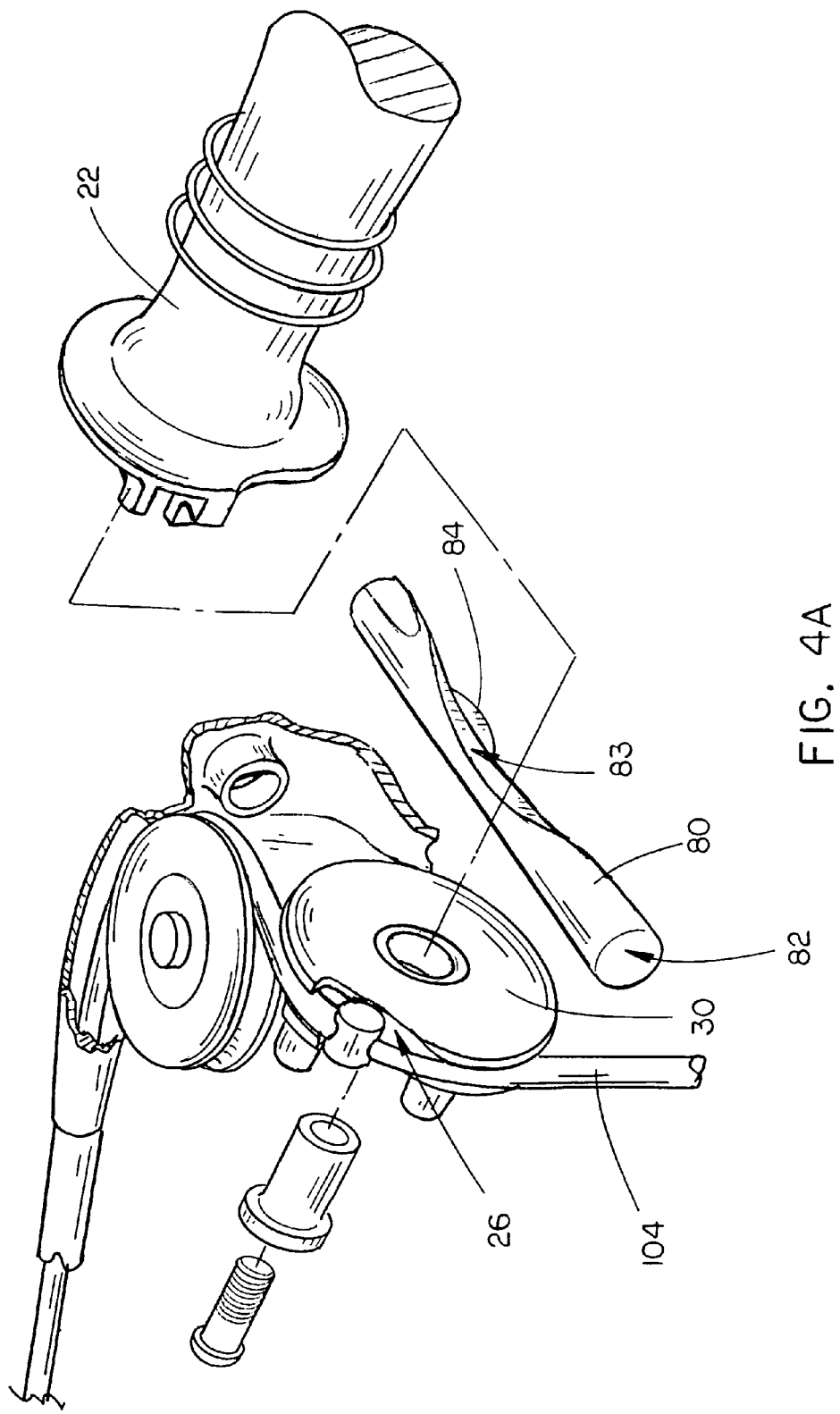
FIG. 4a is a detailed perspective view of the twist-type throttle control device section of the present invention.
Figure 4B:
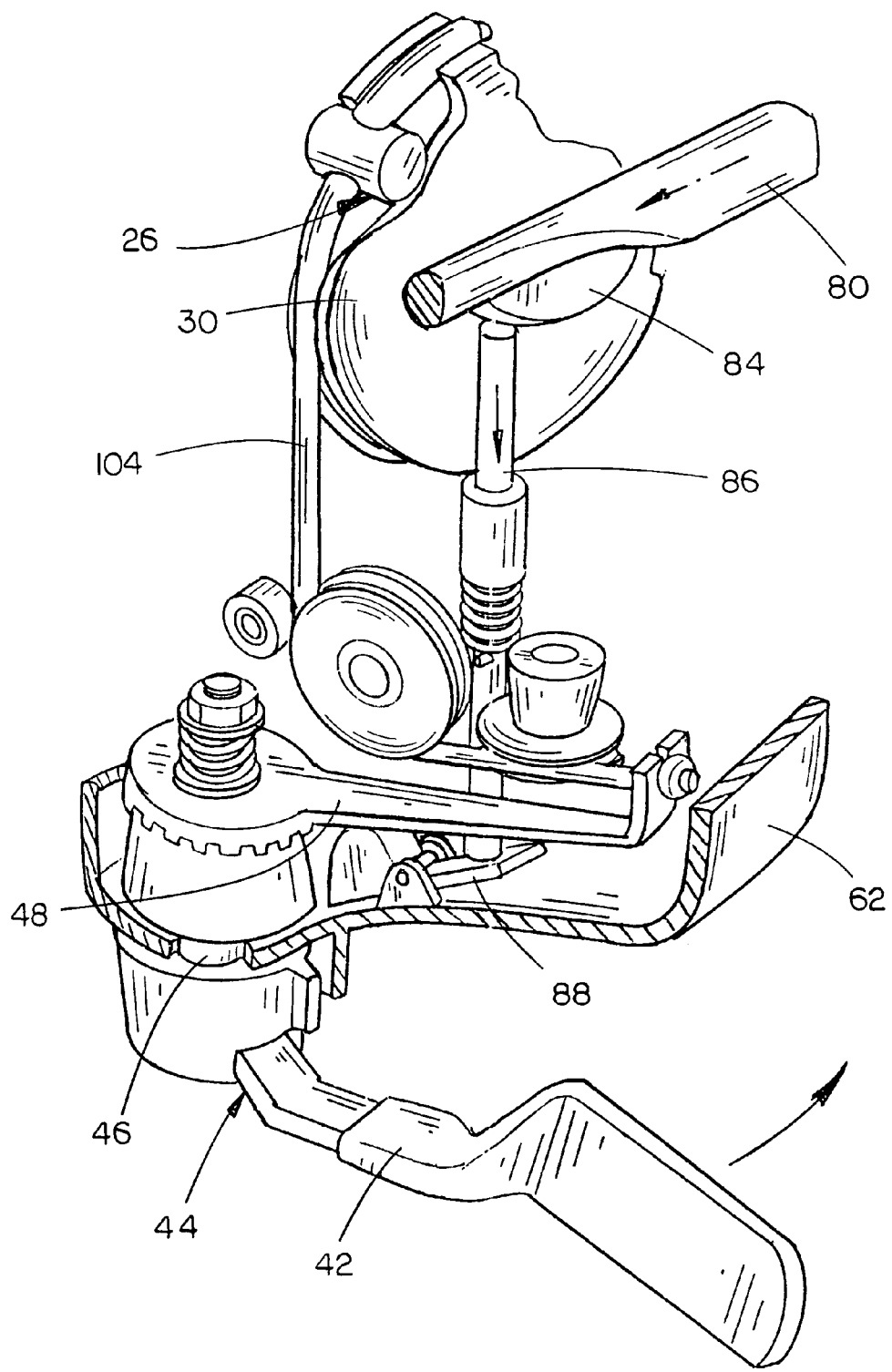
FIGS. 4b, 4c, and 4d are, respectively, a detailed perspective view, a detailed side elevational view, and a detailed side elevational view of throttle control engagement mechanism of the present invention which permits the operator to switch between the twist-type throttle control device and thumb-type throttle control device.
Figure 4C:
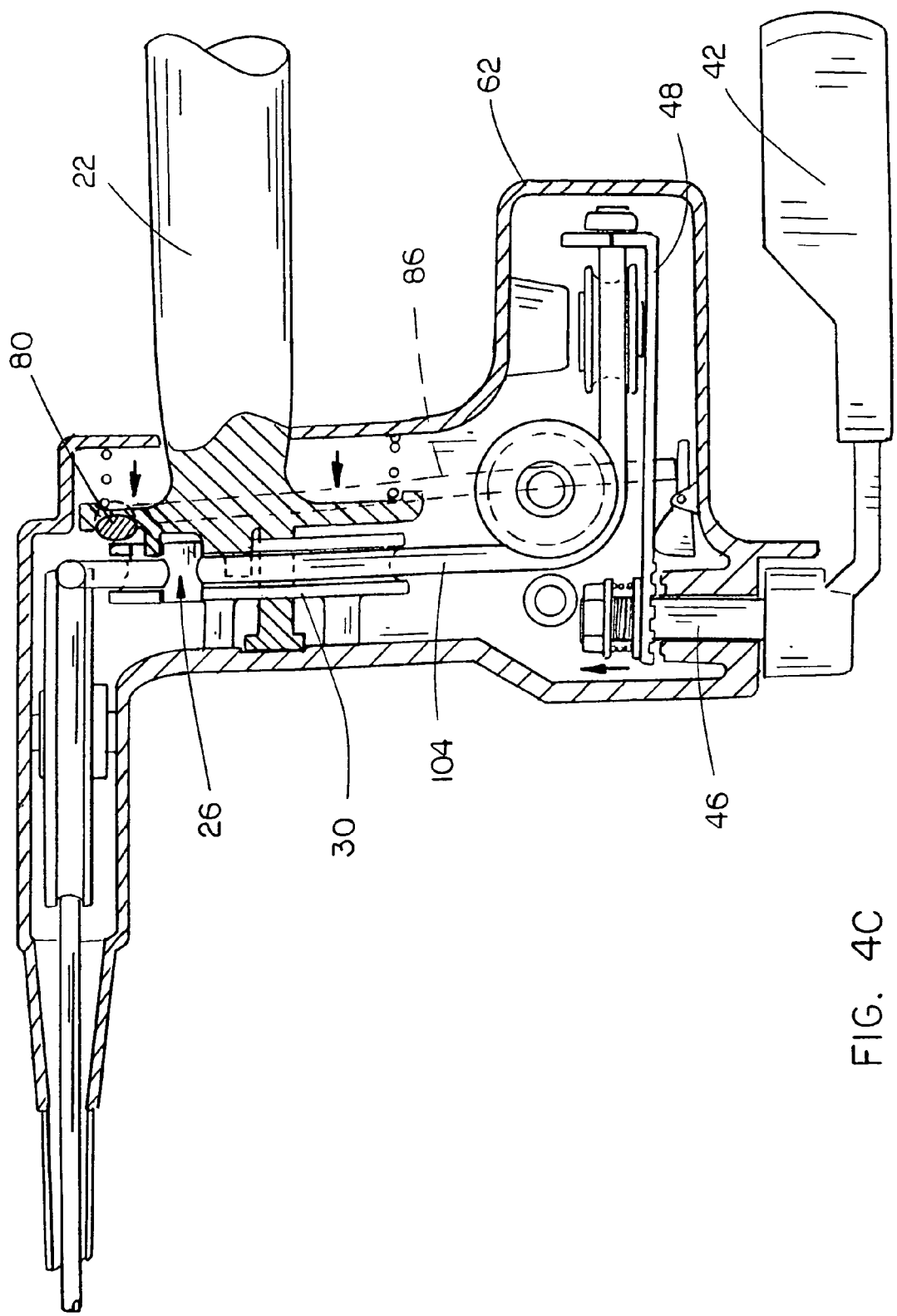
Figure 4D:
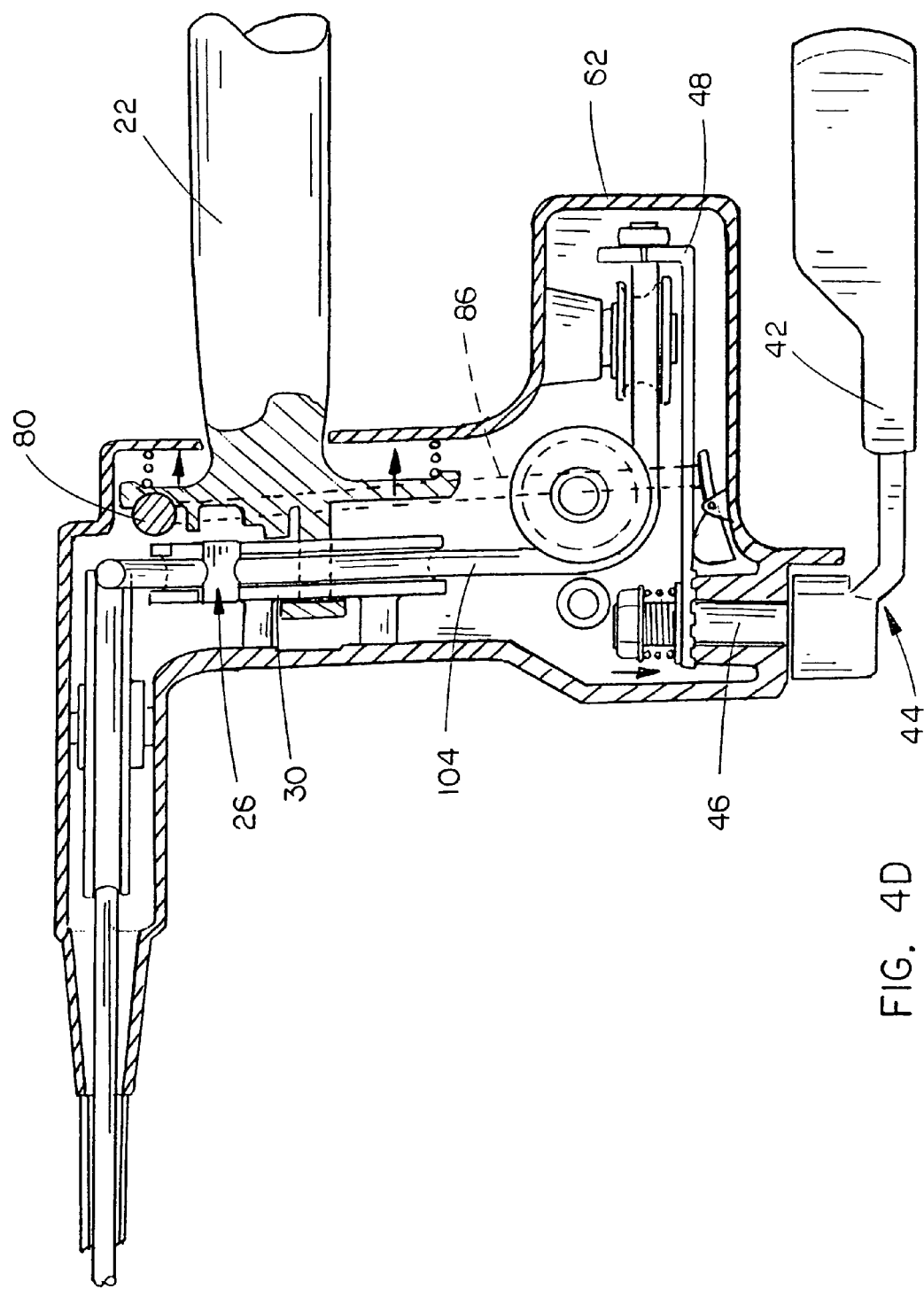

Specifically, throttle control device control mechanism 60 would include a push button-type mechanism having a forward-facing push rod 80 which is movably mounted within the outer casing 62 of throttle control device control mechanism 60, as shown best in FIGS. 2, 4a, and 4b, which preferably covers and encloses the entire mechanism to prevent contaminants from degrading performance of the throttle control device control mechanism 60. The forward end 82 of push rod 80 would extend forwards and outwards from outer casing 62 for engagement by a thumb or finger of the user of the present invention and push rod 80 will be movable along the longitudinal axis of push rod 80, as shown best in FIGS. 4a and 4b. Mounted on the rear end of push rod 80 is a downward-facing cam 84 which selectively engages a spring-loaded upright shaft 86 to depress the upright shaft 86 as cam 84 moves rearwards over the upright shaft 86, as shown best in FIG. 4b. Mounted adjacent the base of upright shaft 86 is a toggle bar 88 which rocks between a disengagement position when upright shaft 86 is not engaged by cam 84 and an engagement position when upright shaft 86 is depressed by cam 84, as shown in FIG. 4c. The toggle bar 88 is positioned to engage the underside of throttle cable connection bar 48 such that when toggle bar 88 is in the engagement position shown in FIG. 4c, the throttle cable connection bar 48 is lifted out of engagement with the upright shaft 46 and thus rotation of thumb lever 42 of thumb-type throttle control device 40 does not result in operation of the throttle cable 104 via second extension section 108. At the same time the throttle cable connection bar 48 is disengaged from the upright shaft 46, the rotatable handle 22 is shifted into engagement with the throttle cable engagement slot 24 and the cable pulley wheel 30 thus permitting the throttle cable engagement slot 24 to operatively connect the rotatable handle 22 with the throttle cable 104, as shown best in FIG. 4c.

In the alternative, when the push rod 80 is extended forward, i.e. released, the cam 84 disengages from contact with the top of upright shaft 86 and thus the spring-loaded upright shaft 86 recoils upwards, thus releasing toggle bar 88 and dropping throttle cable connection bar 48 downwards to intermesh with upright shaft 46. Simultaneously, the rotatable handle 22 of twist-type throttle control device 20 is moved outwards out of connection with throttle cable engagement slot 24 mounted on cable pulley wheel 30, and thus the rotatable handle 22 no longer is operatively connected to the throttle cable 104. Rather, it is the thumb lever 42 of thumb-type throttle control device 40 which is operatively connected to the throttle cable 104 via second extension section 108, as shown best in FIG. 4d. The specific mechanism operative to disengage rotatable handle 22 from throttle cable engagement slot 24 is shown in FIG. 4a as a concave cam section 83 formed on push rod 80, although the exact design of the disengagement mechanism for rotatable handle 22 will likely be modified depending on the precise structure used in connection with the present invention. In this manner, the alternate engagement of the twist-type throttle control device 20 and thumb-type throttle control device 40 is permitted and simultaneous operation of the two throttle control devices is prevented.

A fourth embodiment of the thumb/twist throttle control device 10' is shown best in FIGS. 5-12 as including a control device housing 200 which fits onto and over the handlebar 102 and which further includes a lower section 202 and an upper section 204 connected to one another by bolts or the like, the upper section 204 further including a top plate 206 which can be removed to provide access to the internal elements of the device. The throttle control device 210 of this embodiment would preferably include a throttle cable pulley 212 around which the throttle cable 104 would travel as it enters the throttle control device 210.

The throttle control device 210 is best shown in FIGS. 5-8 as including a twist-type throttle control device 20' which includes a twist throttle base cylinder 220 which fits over the handlebar 102 and is rotatably mounted on the control device housing 200, the twist throttle base cylinder 220 including a rubber grip 222 mounted on the outer surface thereof, an inner section 226 which is rotatably housed within the control device housing 200, and several slots 224 which extend longitudinally through inner section 226 from the inner end thereof. The slots 224 extend generally radially from the center longitudinal axis of the twist throttle base cylinder 220 and their purpose will be discussed later in this disclosure. In the preferred embodiment, the twist throttle base cylinder 220 would have dimensions similar to the rotatably mounted handle 22 described previously.

It is important to note that the handlebar 102 extends through the entire control device housing 200 and thus provides the support structure for each of the elements of the throttle control device 210, and therefore when the interaction between elements is being described herein, it is to be understood that sliding and rotational movement of the elements occurs on the handlebar 102. That being said, the throttle cable engagement spline 230 is positioned adjacent to and in concentric alignment with the twist throttle base cylinder 220, and in the preferred embodiment, the throttle cable engagement spline 230 would be a partial ring of metal or plastic material which includes a cable engagement recess 232 formed on one end thereof, a cable channel 236 formed in the outer surface of the throttle cable engagement spline 230 and which extends circumferentially around the throttle cable engagement spline 230, and several slots 234 which are of the same size and shape and are initially generally aligned with the slots 224 formed in the inner section 226 of the twist throttle base cylinder 220. The throttle cable engagement spline 230 engages the cable connector 105 which is mounted on the end of the throttle cable 104 via the cable engagement recess 232 such that as the throttle cable engagement spline 230 is rotated, the throttle cable 104 is alternatively tensioned and released to control the throttle of the vehicle.

Mounted adjacent to the throttle cable engagement spline 230 in concentric alignment therewith is the thumb lever engagement spline 240, which, in the preferred embodiment, is a ring constructed of metal or plastic which includes a thumb lever attachment hole 242 and several slots 244 which are of the same size and shape of the slots 224 formed in the inner section 226 of the twist throttle base cylinder 220. The thumb lever engagement spline 240 is positioned on the opposite side of the throttle cable engagement spline 230 from the twist throttle base cylinder 220, as shown best in FIGS. 7 and 8, and the thumb lever engagement spline is operatively connected to the thumb-type throttle control device 40' as shown best in FIGS. 7, 9 and 11. Specifically, the thumb throttle lever 290 is mounted on thumb throttle shaft 292 which is rotatably mounted in the lower section 202 of the control device housing 200 and extends upwards therethrough. A shaft arm 294 extends generally perpendicularly outwards from the thumb throttle shaft 292 and a connection arm 296 extends between and connects the outer end of the shaft arm 294 and the thumb lever attachment hole 242 on the thumb lever engagement spline 240 to complete the connection between the thumb-type throttle control device 40' and the thumb lever engagement spline 240. In this manner, rotation of the thumb throttle lever 290 results in rotation of the thumb lever engagement spline 240 in direct proportion to the movement of the thumb throttle lever 290.

Figure 9:
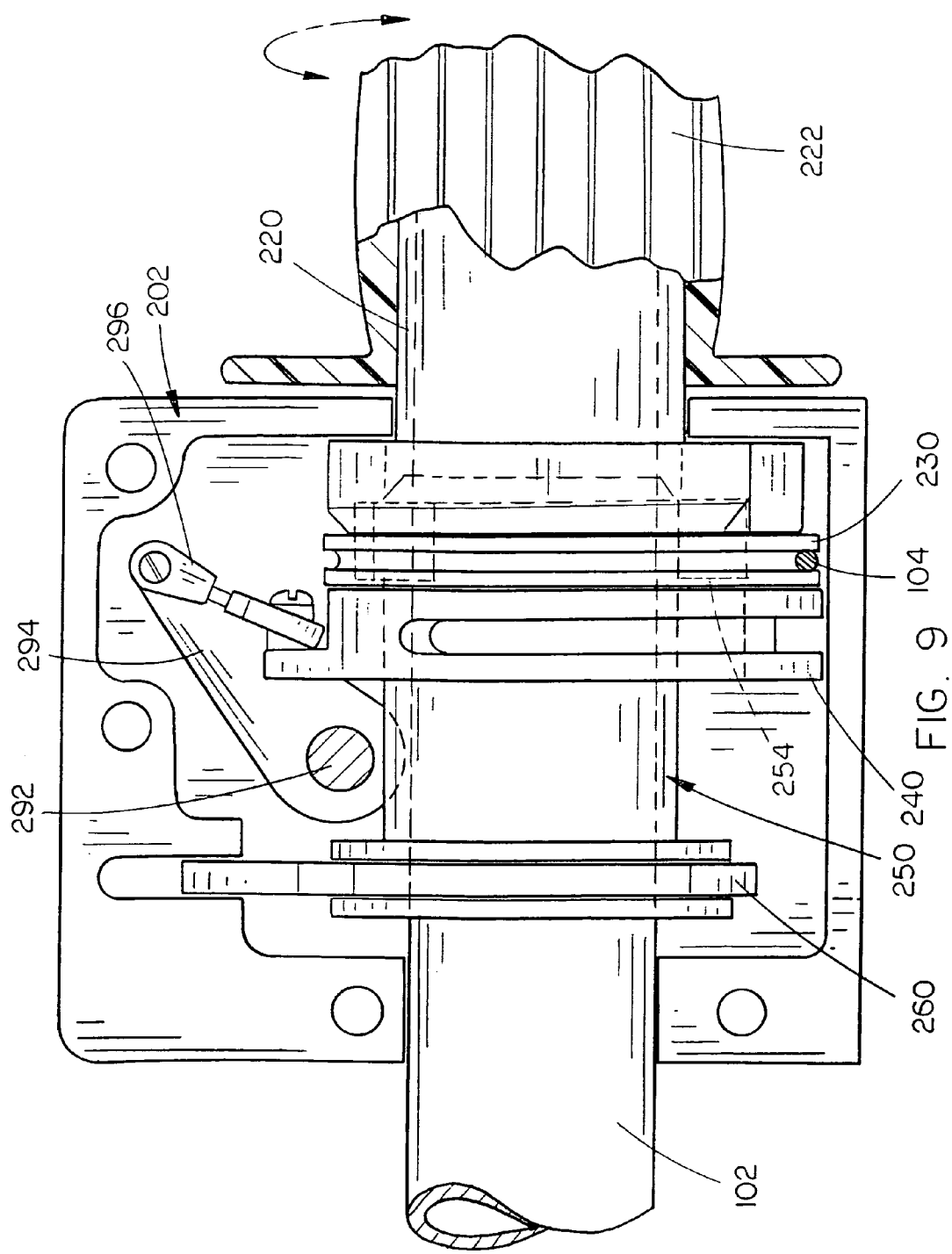
FIG. 9 is a detail top plan view of the embodiment of FIG. 5 showing the transmission and switching mechanism of the thumb-twist throttle control device engaging the twist throttle control device.

The mechanism for switching between the twist-type throttle control device 20' and thumb-type throttle control device 40' will now be described. A throttle selector transmission section 250 includes a throttle selector transmission cylinder 252 which, in the preferred embodiment, would be a metal or plastic cylinder having an inner diameter slightly greater than the outer diameter of the handlebar 102 such that the throttle selector transmission cylinder 252 may slide back and forth on the handlebar 102, as shown best in FIGS. 9, 10 and 11. Projecting outwards from the engagement end of the throttle selector transmission cylinder 252 generally perpendicular to the center longitudinal axis of the throttle selector transmission cylinder 252 are several transmission tabs 254 which are of a size and shape as to fit within each of the several slots 224, 234 and 244 found on the twist throttle base cylinder 220, throttle cable engagement spline 230 and the thumb lever engagement spline 240. In operation, the throttle selector transmission cylinder 252 would slide back and forth, and the length of each of the transmission tabs 254 is such that when the throttle selector transmission cylinder 250 is farthest towards the twist throttle base cylinder 220, as shown in FIG. 9, the transmission tabs 254 each engage the slots 224 and 234 on the twist throttle base cylinder 220 and throttle cable engagement spline 230 but do not engage the slots 244 on the thumb lever engagement spline 240. This causes the twist throttle base cylinder 220 and the throttle cable engagement spline 230 to rotate in unison, and therefore rotation of the twist throttle base cylinder 220 results in rotation of the throttle cable engagement spline 230. This, of course, means that the twist-type throttle control device 20' will control the operation of the throttle of the vehicle when the throttle selector transmission cylinder 250 is positioned towards and adjacent the inner section 226 of the twist throttle base cylinder 220.

Figure 11:
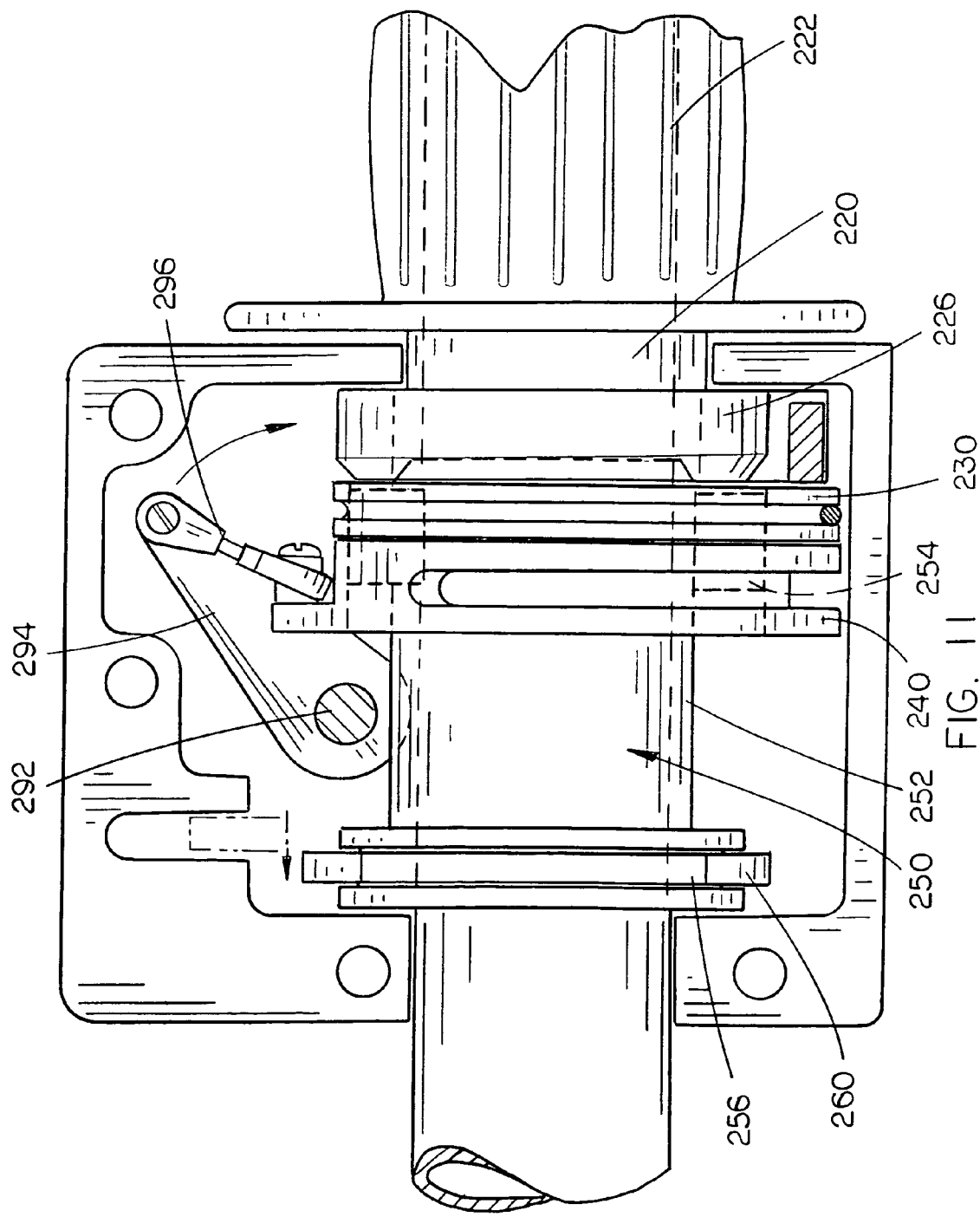
FIG. 11 is a detail top plan view of the embodiment of FIG. 5 showing the transmission and switching mechanism of the thumb-twist throttle control device engaging the thumb throttle control device.

Conversely, when the throttle selector transmission cylinder 250 is positioned farthest away from the inner section 226 of the twist throttle base cylinder 220, as shown in FIG. 11, the transmission tabs 254 engage the several slots 234 and 244 on the throttle cable engagement spline 230 and the thumb lever engagement spline 240 but do not engage the slots 224 on the twist throttle base cylinder 220. This causes the throttle cable engagement spline 230 and the thumb lever engagement spline 240 to rotate in unison, and therefore rotation of the thumb lever engagement spline 240 results in rotation of the throttle cable engagement spline 230. This, of course, means that the thumb-type throttle control device 40' will control the operation of the throttle of the vehicle when the throttle selector transmission cylinder 250 is positioned farthest away from the inner section 226 of the twist throttle base cylinder 220.

Figure 6:
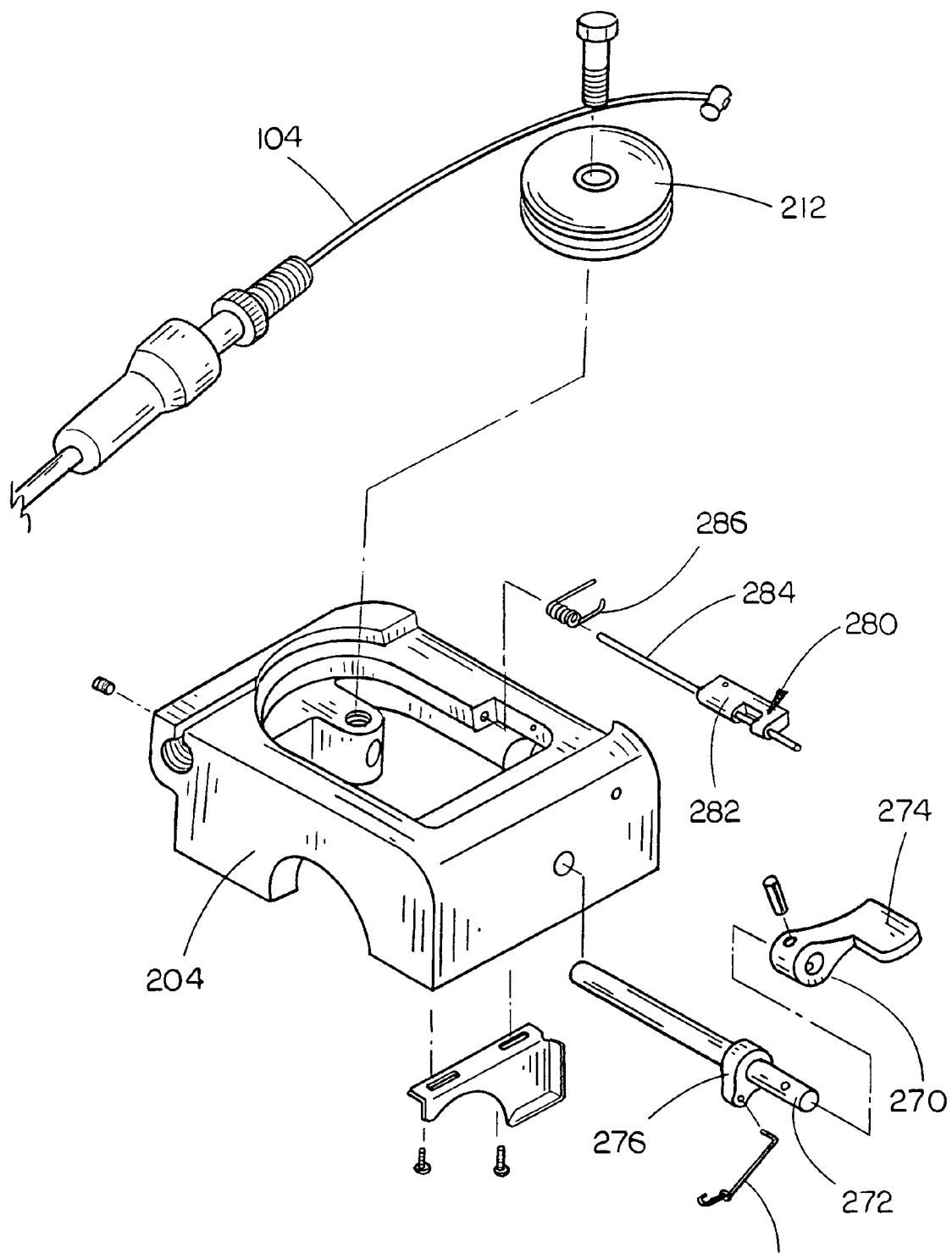
FIG. 6 is a detail exploded perspective view of the embodiment of FIG. 5 showing the top portion of the thumb-twist throttle control device.
Figure 7:
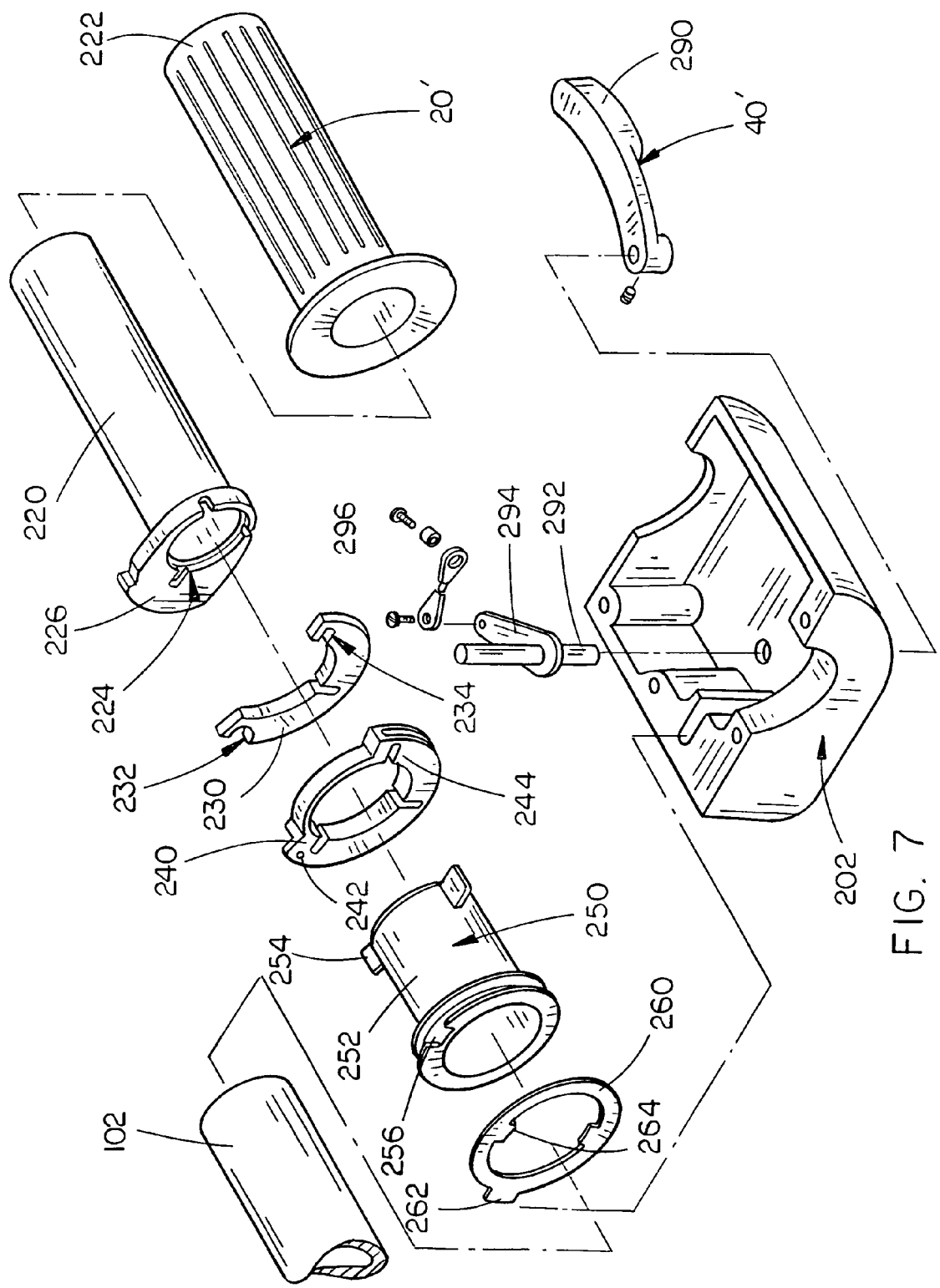
FIG. 7 is a detail exploded perspective view of the embodiment of FIG. 5 showing the bottom portion of the thumb-twist throttle control device.
Figure 8:
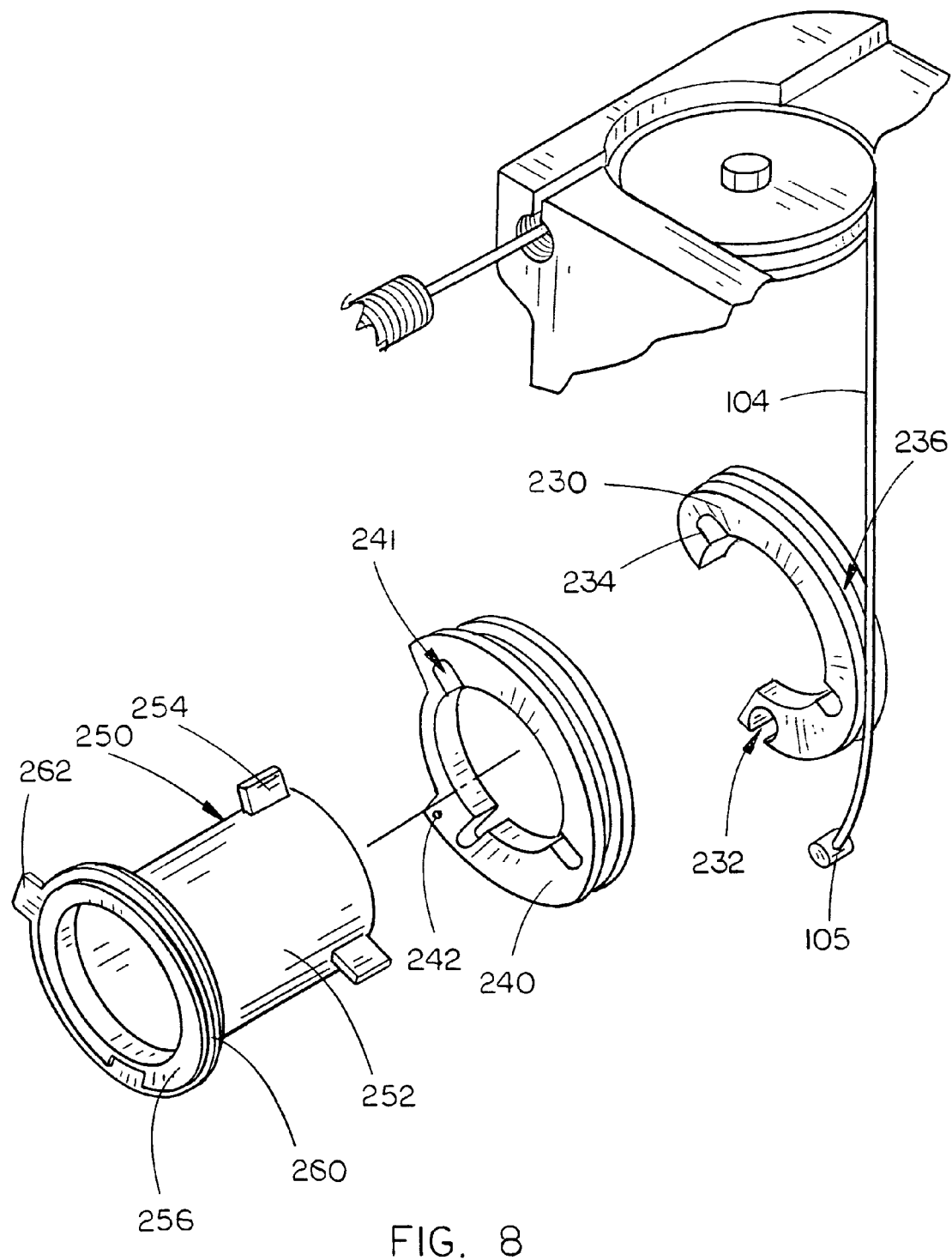
FIG. 8 is a detail exploded perspective view of the embodiment of FIG. 5 showing the transmission and switching mechanism of the thumb-twist throttle control device.
Figure 10:
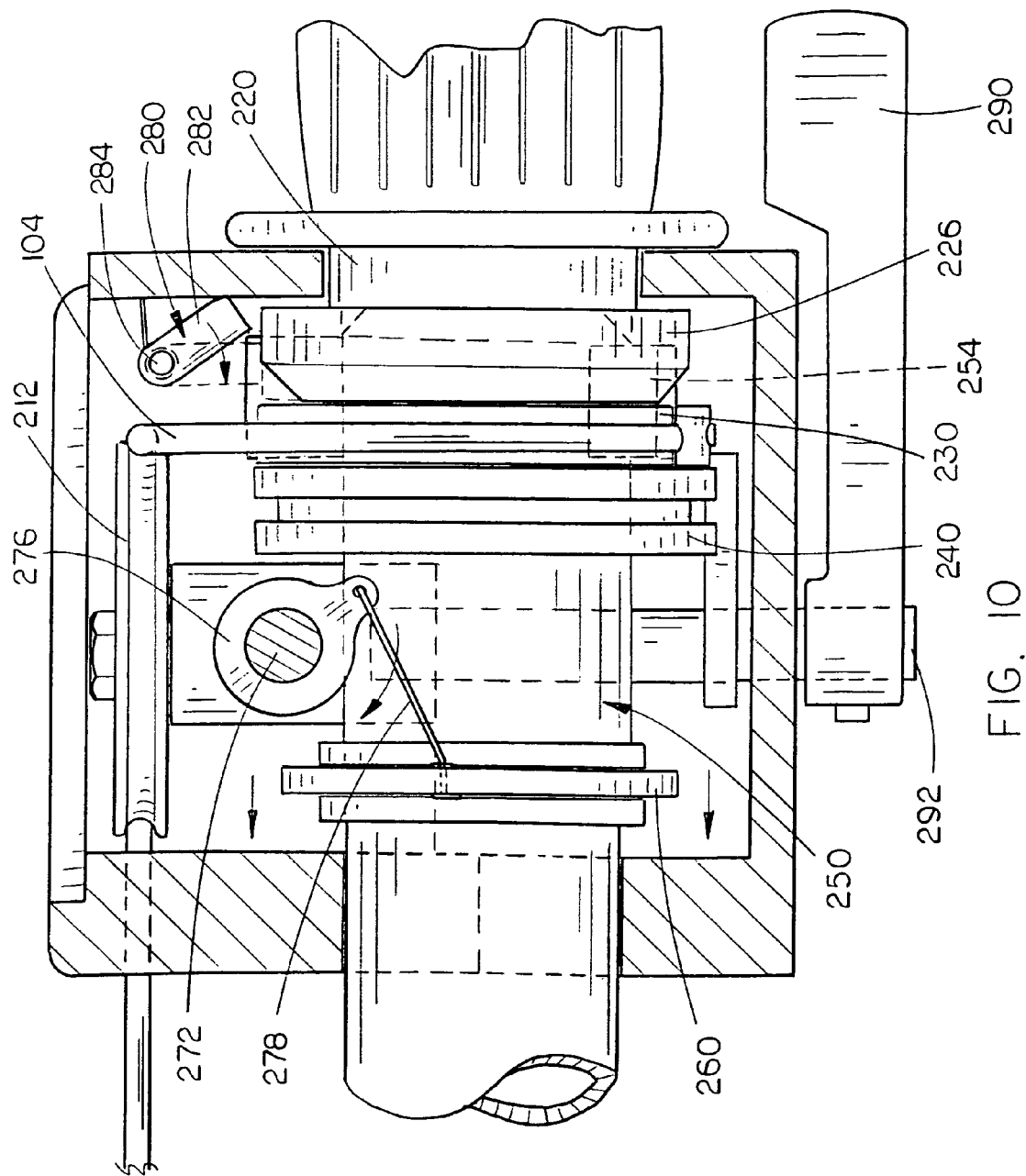
FIG. 10 is a detail side elevational view of the embodiment of FIG. 5 showing the transmission and switching mechanism of the thumb-twist throttle control device being switched to engage the thumb throttle control device.

The throttle control selection mechanism 270 is shown best in FIGS. 6 and 10 as including a throttle selector input shaft 272 which extends generally horizontally through the control device housing 200 and is rotatable about its center longitudinal axis. Mounted on the throttle selector input shaft 272 inside the control device housing 200 is a shaft collar 276, and mounted on the throttle selector input shaft 272 externally of the control device housing 200 is a selector lever 274 which may be manipulated to rotate the throttle selector input shaft 272. Mounted on and extending outwards from the shaft collar 276 is a selector arm 278 which provides the mechanical translation to permit the rotation of the throttle selector input shaft 272 to shift the position of the throttle selector transmission cylinder 250.

A shift ring 260 is mounted on the throttle selector transmission cylinder 252 by a pair of shift ring securement tabs 264 which extend into a shift ring engagement channel 256 formed at the far end of the throttle selector transmission cylinder 252 as shown best in FIG. 10, and the selector arm 278 is connected to one side of the shift ring 260. The opposite side of the shift ring 260 includes a pivot tab 262 which extends into an opening formed in the lower section 202 as shown in FIG. 9, thus allowing the shift ring 260 to pivot and move the throttle selector transmission cylinder 252 therewith as the shift ring 260 pivots. Rotation of the throttle selector input shaft 272 causes the selector arm 278 to pivot the shift ring 260 thereby moving the throttle selector transmission cylinder 252 between the positions as described previously.

Also, it may be important to include a twist throttle stop device 280 which will prevent rotation of the twist-type throttle control device 20 upon engagement thereof. This will prevent unintentional rotation of the twist-type throttle control device 20 when the thumb-type throttle control device 40 is engaged which is important for safety purposes. Briefly, the twist throttle stop device 280 is shown best in FIGS. 6 and 10 as including a rotating stop shaft 284 on which is mounted a stop bar 282 which engages the inner section 226 of the twist throttle base cylinder 220 when the stop shaft is rotated as shown in FIG. 10. A torsion spring 286 biases the stop shaft 284 to rotate into the stop position, but when the throttle selector transmission cylinder 252 is adjacent the twist throttle base cylinder 220 as shown in FIG. 9, the throttle selector transmission cylinder 252 physically moves the twist throttle stop device 280 out of the stop position thus allowing the twist throttle base cylinder 220 to rotate. When the throttle selector transmission cylinder 252 moves away from the twist throttle base cylinder 220, however, the torsion spring 286 biases the stop shaft 284 to rotate into the stop position such that the stop bar 282 engages the inner section 226 of the twist throttle base cylinder 220 thus preventing unauthorized rotation of the twist throttle base cylinder 220.

Figure 12:
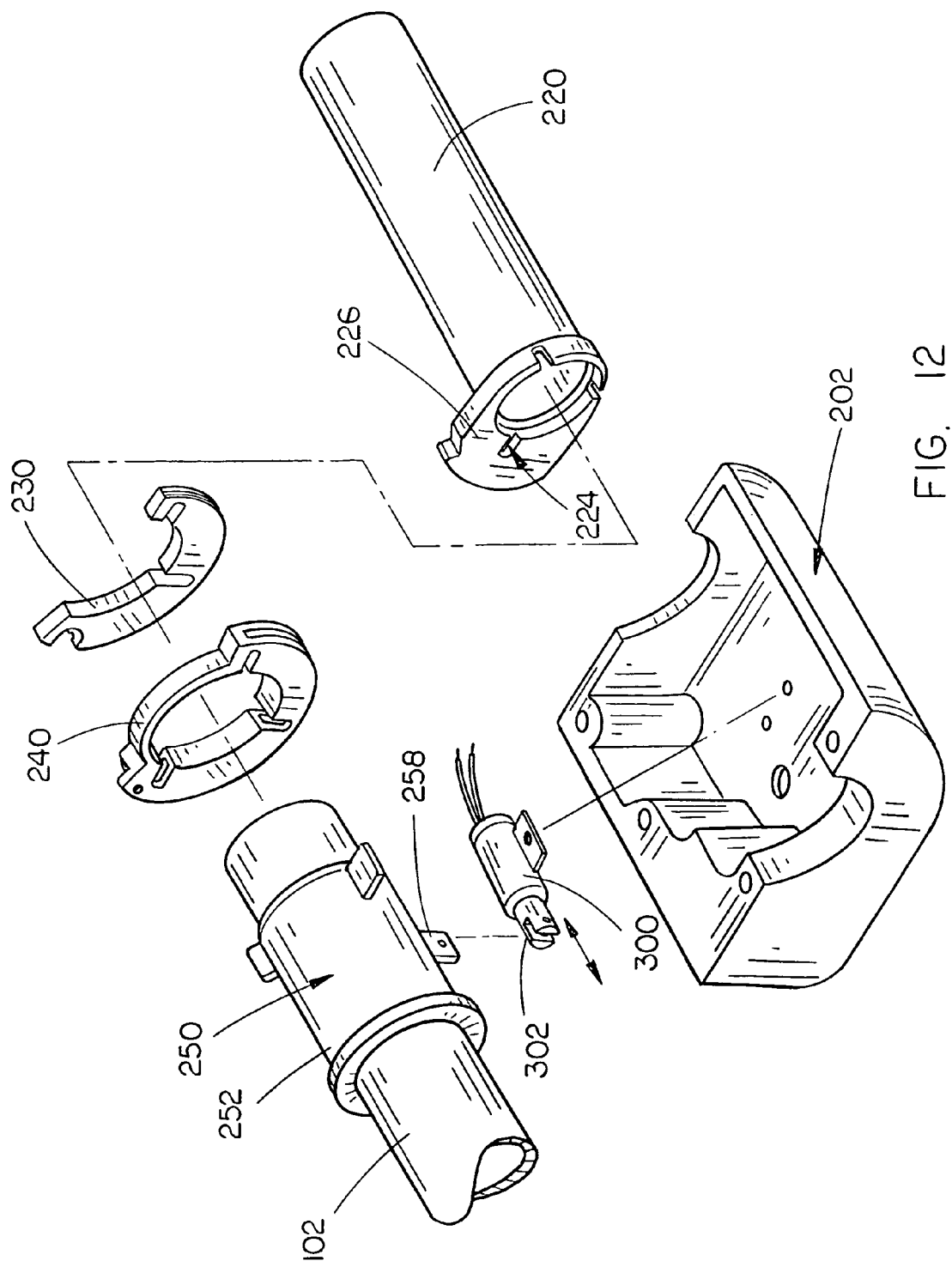
FIG. 12 is a detail exploded perspective view of the embodiment of FIG. 5 in which the mechanical switching mechanism is substituted by a solenoid for switching between the thumb and twist throttle control devices.

The user of the present invention may thus quickly and easily shift between the twist-type throttle control device 20' and the thumb-type throttle control device 40' for operation of the throttle of the vehicle by simply rotating the selector lever 274 to rotate the throttle selector input shaft 272 thus moving the throttle selector transmission cylinder 252 between the engagement position for the twist-type throttle control device 20' and the engagement position for the thumb-type throttle control device 40'. Alternatively, instead of providing a mechanical device such as the selector lever 274 and the throttle selector input shaft 272, it may be preferable to include a solenoid 300 or another such electrically activated force-producing device which is operatively connected to the throttle selector transmission cylinder 252 via a solenoid connection tab 258, as shown in FIG. 12. A selector button would be provided on the exterior of the control device housing 200 for operating the solenoid 300, which would cause the solenoid piston 302 to fire or retract thus shifting the throttle selector transmission cylinder 252 as was described previously. It is believed that by utilizing such an electronic shifting mechanism, the mechanical complexity of the present invention may be significantly decreased, thereby lessening the opportunity for mechanical breakdown and thus likely increasing the reliability and longevity of the present invention. Of course, many different types of electrical and mechanical force-producing devices may be substituted for the devices described herein, and such substitution should be understood to be a part of this disclosure and invention.

There are several additional features which may be incorporated into the thumb/twist throttle control device 10 of the present invention which will facilitate operation and use of the present invention. Specifically, in one preferred embodiment, it may be desirable to have the thumb lever 42 rotate out of the way of operation of the twist-type throttle control device 20 when the thumb-type throttle control device 40 is disengaged, and it will be a relatively simple matter to include a rotating cam or gear assembly to facilitate such rotation of the thumb lever 42. Furthermore, the precise placement of the various pulleys of the present invention may be modified or changed depending upon the orientation and arrangement of the elements of the thumb/twist throttle control device 10 of the present invention, and such modification are well within the purview of the present disclosure and so long as the throttle cable 104. Also, it is important to note that while the thumb/twist throttle control device 10 has been described with some particularity, many variations of the operative elements described may be incorporated into the present invention so long as the intended general function of providing either a twist-type throttle control device 20 or a thumb-type throttle control device 40 in a single coordinated unit is maintained. Therefore, it is to be understood that numerous additions, substitutions and modifications may be made to the thumb/twist throttle control device 10 of the present invention which fall within the intended broad scope of the above description.

There has therefore been shown and described a thumb/twist throttle control device 10 which accomplishes at least all of its intended objectives.

We claim:

1. A thumb-twist throttle control device for vehicles comprising:
   a control device housing;
   a twist throttle control device mounted on said control device housing and extending outwards therefrom, said twist throttle control device including a rotatable handle which is rotatable about its center longitudinal axis;
   a thumb throttle control device mounted on said control device housing generally adjacent said twist throttle control device, said thumb throttle control device including an outwardly-extending lever pivotably mounted on said control device housing;
   a throttle control device control mechanism mounted within said control device housing operatively interposed between said twist throttle control device and said thumb throttle control device and the throttle of the vehicle on which said thumb-twist throttle control device is mounted, said throttle control device control mechanism operative to select one of said twist throttle control device and said thumb throttle control device and to operatively connect said selected one of said twist throttle control device and said thumb throttle control device to the throttle of the vehicle on which said thumb-twist throttle control device is mounted; and
   said throttle control device control mechanism further operative to selectively engage and connect said selected one of said twist throttle control device and said thumb throttle control device to the throttle of the vehicle on which said thumb-twist throttle control device is mounted such that each is independently operable to control the throttle such that when said twist throttle control device is being used to operate the throttle, said thumb throttle control device is disengaged and when said thumb throttle control device is operating the throttle, said twist throttle control device is disengaged.

2. The thumb-twist throttle control device for vehicles of claim 1 wherein said control device housing is adapted to be fit onto the generally cylindrical handlebar of a vehicle.

3. The thumb-twist throttle control device for vehicles of claim 1 wherein said throttle control device control mechanism comprises a twist throttle base cylinder operatively connected to said twist throttle control device, a throttle cable engagement spline connected to the throttle cable, a thumb lever engagement spline operatively connected to said thumb throttle control device and a throttle selector transmission cylinder, all concentrically supported within said control device housing, and a throttle selector operative to alternatively connect said throttle selector transmission cylinder to said twist throttle base cylinder and said throttle cable engagement spline or to said throttle cable engagement spline and said thumb lever engagement spline whereby control of the throttle is performed through the selected one of said twist throttle control device and said thumb throttle control device.

4. The thumb-twist throttle control device for vehicles of claim 3 wherein said throttle selector transmission cylinder further comprises at least one transmission tab mounted thereon and extending outwards therefrom, said at least one transmission tab operative to engage the selected one of said twist throttle base cylinder and said throttle cable engagement spline and said thumb lever engagement spline.

5. The thumb-twist throttle control device for vehicles of claim 1 wherein said throttle control device control mechanism further includes a solenoid operative to select a respective one of said twist throttle control device and said thumb throttle control device to control the throttle.

6. The thumb-twist throttle control device for vehicles of claim 1 adapted to fit on a selected one of an all-terrain vehicle, a snowmobile and a personal watercraft.

7. A thumb-twist throttle control device for vehicles comprising:
   a control device housing;
   a twist throttle control device mounted on said control device housing and extending outwards therefrom, said twist throttle control device including a twist throttle base cylinder which is rotatable about its center longitudinal axis;
   a thumb throttle control device mounted on said control device housing generally adjacent said twist throttle control device, said thumb throttle control device including an outwardly-extending lever pivotably mounted on said control device housing, said outwardly-extending lever operatively connected to a thumb lever engagement spline;
   throttle cable engagement spline mounted within said control device housing which is operatively connected to the throttle of the vehicle;
   said twist throttle base cylinder, said thumb lever engagement spline and said throttle cable engagement spline together comprising a throttle control device control mechanism mounted within said control device housing, said throttle control device control mechanism further including a throttle selector transmission cylinder operative to alternatively interconnect said twist throttle base cylinder and said throttle cable engagement spline or said throttle cable engagement spline and said thumb lever engagement spline whereby control of the throttle is performed through the selected one of said twist throttle control device and said thumb throttle control device; and
   said throttle control device control mechanism further operative to selectively engage and connect said selected one of said twist throttle control device and said thumb throttle control device to the throttle of the vehicle on which said thumb-twist throttle control device is mounted such that each is independently operable to control the throttle such that when said twist throttle control device is being used to operate the throttle, said thumb throttle control device is disengaged and when said thumb throttle control device is operating the throttle, said twist throttle control device is disengaged.

8. The thumb-twist throttle control device for vehicles of claim 7 wherein said control device housing is adapted to be fit onto the generally cylindrical handlebar of a vehicle.

9. The thumb-twist throttle control device for vehicles of claim 7 wherein said throttle selector transmission cylinder further comprises at least one transmission tab mounted thereon and extending outwards therefrom, said at least one transmission tab operative to engage the selected one of said twist throttle base cylinder and said throttle cable engagement spline and said thumb lever engagement spline.

10. The thumb-twist throttle control device for vehicles of claim 7 wherein said throttle control device control mechanism further includes a solenoid operative to select a respective one of said twist throttle control device and said thumb throttle control device to control the throttle.

11. The thumb-twist throttle control device for vehicles of claim 7 adapted to fit on a selected one of an all-terrain vehicle, a snowmobile and a personal watercraft.

12. A thumb-twist throttle control device for vehicles comprising:
- a control device housing;
- a twist throttle control device mounted on said control device housing and extending outwards therefrom, said twist throttle control device including a rotatable handle which is rotatable about its center longitudinal axis;
- a thumb throttle control device mounted on said control device housing generally adjacent said twist throttle control device, said thumb throttle control device including an outwardly-extending lever pivotably mounted on said control device housing;
- a throttle control device control mechanism mounted within said control device housing operatively interposed between said twist throttle control device and said thumb throttle control device and the throttle of the vehicle on which said thumb-twist throttle control device is mounted, said throttle control device control mechanism operative to select one of said twist throttle control device and said thumb throttle control device and to operatively connect said selected one of said twist throttle control device and said thumb throttle control device to the throttle of the vehicle on which said thumb-twist throttle control device is mounted; and
- said throttle control device control mechanism further operative to selectively engage and connect said selected one of said twist throttle control device and said thumb throttle control device to the throttle of the vehicle on which said thumb-twist throttle control device is mounted such that each is independently operable to control the throttle.

* * * * *